United States Patent
Zoellner et al.

(10) Patent No.: US 8,510,331 B1
(45) Date of Patent: Aug. 13, 2013

(54) SYSTEM AND METHOD FOR A DESKTOP AGENT FOR USE IN MANAGING FILE SYSTEMS

(75) Inventors: Keith Zoellner, Austin, TX (US); Peter A. Lee, Pflugerville, TX (US); Dmitriy Blok, Austin, TX (US)

(73) Assignee: Storediq, Inc., Austin, TX (US)

(*) Notice: Subject to any disclaimer, the term of this patent is extended or adjusted under 35 U.S.C. 154(b) by 0 days.

(21) Appl. No.: 12/840,804

(22) Filed: Jul. 21, 2010

Related U.S. Application Data

(63) Continuation-in-part of application No. 11/262,283, filed on Oct. 28, 2005, now Pat. No. 7,801,894.

(60) Provisional application No. 60/622,733, filed on Oct. 28, 2004, provisional application No. 60/622,818, filed on Oct. 28, 2004, provisional application No. 60/622,820, filed on Oct. 28, 2004, provisional application No. 60/622,951, filed on Oct. 28, 2004, provisional application No. 60/622,955, filed on Oct. 28, 2004, provisional application No. 60/623,027, filed on Oct. 28, 2004, provisional application No. 61/227,180, filed on Jul. 21, 2009.

(51) Int. Cl.
*G06F 7/00* (2006.01)
*G06F 17/30* (2006.01)

(52) U.S. Cl.
USPC .......................................................... 707/770

(58) Field of Classification Search
USPC .......................................................... 707/770
See application file for complete search history.

(56) References Cited

U.S. PATENT DOCUMENTS

| | | | |
|---|---|---|---|
| 4,887,204 A | 12/1989 | Johnson et al. | |
| 4,897,781 A | 1/1990 | Chang et al. | |
| 5,151,989 A | 9/1992 | Johnson et al. | |
| 5,175,851 A | 12/1992 | Johnson et al. | |
| 5,287,507 A | 2/1994 | Hamilton et al. | |
| 5,313,646 A | 5/1994 | Hendricks et al. | |
| 5,452,447 A | 9/1995 | Nelson et al. | |
| 5,745,752 A | 4/1998 | Hurvig et al. | |
| 5,764,908 A | 6/1998 | Shoji et al. | |
| 5,764,972 A | 6/1998 | Crouse et al. | |
| 5,819,292 A | 10/1998 | Hitz et al. | |
| 5,864,659 A | 1/1999 | Kini | |

(Continued)

OTHER PUBLICATIONS

RFC1094 "Network Working Group Request for Comments: 1094" Sun Microsystems, Inc., accessed at www.faqs.org/rfcs/rfc1094.html, Mar. 1989, 21 pages.

(Continued)

*Primary Examiner* — Fred I Ehichioya
*Assistant Examiner* — Kris Mackes
(74) *Attorney, Agent, or Firm* — Sprinkle IP Law Group

(57) ABSTRACT

Embodiments of desktop agents for use in file management are disclosed. Specifically, in certain embodiments a set of desktop computers within a particular networked environment where it is desired to install these desktop agents may be determined. Desktop agents may then be installed on these desktops. A desktop agent on a particular desktop computer may register with an appliance such as that described above and be given an objective including one or more tasks. For each of the tasks provided, the desktop agent may return a list of files which can be collected based on the classification(s) associated with that task. Specific files to collect may then be selected from the list of files such that these specific files may be sent from the desktop computer to the appliance by the desktop agent and stored.

21 Claims, 8 Drawing Sheets

(56) References Cited

U.S. PATENT DOCUMENTS

| | | |
|---|---|---|
| 5,870,734 A | 2/1999 | Kao |
| 5,870,746 A | 2/1999 | Knutson et al. |
| 5,926,805 A | 7/1999 | Hurvig et al. |
| 5,931,918 A | 8/1999 | Row et al. |
| 5,948,062 A | 9/1999 | Tzelnic et al. |
| 5,987,506 A | 11/1999 | Carter et al. |
| 6,078,929 A | 6/2000 | Rao |
| 6,081,807 A | 6/2000 | Story et al. |
| 6,085,234 A | 7/2000 | Pitts et al. |
| 6,119,118 A | 9/2000 | Kain et al. |
| 6,122,629 A | 9/2000 | Walker et al. |
| 6,134,583 A | 10/2000 | Herriot |
| 6,161,191 A | 12/2000 | Slaughter et al. |
| 6,173,293 B1 | 1/2001 | Thekkath |
| 6,192,408 B1 | 2/2001 | Vahalia et al. |
| 6,205,441 B1 | 3/2001 | Al-omari et al. |
| 6,233,624 B1 | 5/2001 | Hyder et al. |
| 6,247,139 B1 | 6/2001 | Walker et al. |
| 6,266,785 B1 | 7/2001 | McDowell |
| 6,298,386 B1 | 10/2001 | Vahalia et al. |
| 6,317,844 B1 | 11/2001 | Kleiman |
| 6,334,123 B1 | 12/2001 | Ross et al. |
| 6,336,137 B1 | 1/2002 | Lee et al. |
| 6,366,987 B1 | 4/2002 | Tzelnic et al. |
| 6,385,624 B1 | 5/2002 | Shinkai |
| 6,389,420 B1 | 5/2002 | Vahalia et al. |
| 6,453,353 B1 | 9/2002 | Win et al. |
| 6,463,465 B1 | 10/2002 | Nieuwejaar |
| 6,487,552 B1 | 11/2002 | Lei et al. |
| 6,654,814 B1 | 11/2003 | Britton |
| 6,754,660 B1 | 6/2004 | MacPhail |
| 6,807,632 B1 | 10/2004 | Carpentier et al. |
| 6,826,582 B1 | 11/2004 | Chatterjee et al. |
| 6,833,865 B1 | 12/2004 | Fuller et al. |
| 7,017,183 B1 | 3/2006 | Frey et al. |
| 7,249,168 B1 | 7/2007 | Ryder |
| 7,610,329 B2 | 10/2009 | Bone et al. |
| 7,620,665 B1 | 11/2009 | George et al. |
| 7,801,894 B1 | 9/2010 | Bone et al. |
| 7,805,449 B1 | 9/2010 | Bone et al. |
| 7,844,582 B1 | 11/2010 | Arbilla |
| 8,032,501 B2 | 10/2011 | Bone et al. |
| 8,086,553 B2 | 12/2011 | Bone et al. |
| 8,417,678 B2 | 4/2013 | Bone et al. |
| 2002/0046262 A1 | 4/2002 | Heilig et al. |
| 2002/0059604 A1 | 5/2002 | Papagan |
| 2002/0088000 A1 | 7/2002 | Morris |
| 2002/0091710 A1 | 7/2002 | Dunham et al. |
| 2002/0099697 A1 | 7/2002 | Jensen-Grey |
| 2002/0156840 A1 | 10/2002 | Ulrich et al. |
| 2002/0174306 A1 | 11/2002 | Gajjar et al. |
| 2002/0198976 A1 | 12/2002 | Davenport |
| 2003/0009469 A1 | 1/2003 | Platt et al. |
| 2003/0135505 A1 | 7/2003 | Hind |
| 2003/0135513 A1 | 7/2003 | Quinn et al. |
| 2003/0212676 A1 | 11/2003 | Bruce et al. |
| 2004/0098415 A1 | 5/2004 | Bone et al. |
| 2004/0181753 A1 | 9/2004 | Michaelides |
| 2005/0120025 A1 | 6/2005 | Rodriguez et al. |
| 2005/0183143 A1 | 8/2005 | Anderholm |
| 2005/0228874 A1* | 10/2005 | Edgett et al. ............... 709/220 |
| 2006/0004830 A1 | 1/2006 | Lora et al. |
| 2006/0020814 A1* | 1/2006 | Lieblich et al. ............ 713/182 |
| 2006/0036605 A1 | 2/2006 | Powell et al. |
| 2006/0089932 A1 | 4/2006 | Buehler et al. |
| 2006/0117014 A1 | 6/2006 | Qi |
| 2006/0184530 A1 | 8/2006 | Song et al. |
| 2006/0190455 A1 | 8/2006 | Braddy et al. |
| 2006/0248085 A1 | 11/2006 | Sack et al. |
| 2006/0277184 A1 | 12/2006 | Faitelson et al. |
| 2007/0022129 A1* | 1/2007 | Bahar et al. ............... 707/100 |
| 2010/0088317 A1 | 4/2010 | Bone et al. |
| 2010/0145917 A1 | 6/2010 | Bone et al. |
| 2010/0179941 A1* | 7/2010 | Agrawal et al. ............ 707/624 |
| 2010/0306337 A1* | 12/2010 | DeHaan ..................... 709/213 |
| 2012/0136843 A1 | 5/2012 | Bone et al. |

OTHER PUBLICATIONS

"File and Storage System Design", accessed at www.eecs.harvard.edu/~vino/fs-perf/, printed Jul. 25, 2002, 3 pages.

"The extended-2 filesystem overview", vol. 1, Aug. 3, 1995, 17 pages.

"Draft-leach-cifs-vl-spec-02" Network Working Group, accessed at www.ubiqx.org/cifs/rfc-draft/draft-leach-cifs-v1-spec-02.html, Mar. 13, 1997, 172 pages.

AFS Frequently Asked Questions, accessed at www.angelfire.com/hi/plutonic/afs-faq.html, printed Jul. 25, 2002, 58 pages.

Coda File System, accessed at www.coda.cs.cmu.edu/index.html, printed Jul. 25, 2002, 2 pages.

RFC1777 "Network Working Group Request for Comments: 1777" Performance Systems International, accessed at www.faqs.org/rfcs/rfc1777.html, Mar. 1995, 18 pages.

"Active Directory: A Platform for Directory-enabled Networking", accessed at www.microsoft.com/windows2000/techinfo/planning/activedirectory/denad.asp, posted Nov. 7, 2000, 11 pages.

Pendry, "Amd an Automounter (1989)", accessed at www.citeseer.nj.nec.com/pendry89amd.html, printed Jul. 25, 2002, 1 page.

Oga, "Autofs Automounter HOWTO", accessed at www.linux-consulting.com/Amd_AutoFS/autofs.html, Dec. 1998, 2 pages.

Satran, et al. "IPS Internet Draft: iSCSI", accessed at www.ietf.org/internet-drafts/draft-ietf-ips-iscsi-14.txt, Jul. 1, 2002, 217 pages.

Rajagopal, et al. "IPS Working Group: Fibre Channel Over TCP/IP (FCIP)", accessed at www.ietf.org/internet-drafts/draft-ietf-ips-fcovertcpip-11.txt, Dec. 2002, 63 pages.

Rodriguez, et al. "IP Storage (IPS)", accessed at www.ietf.org/html/charters/ips-charter.html, Jul. 2, 2002, 5 pages.

"Distributed File System: White Paper", accessed at www.microsoft.com/windows2000/techinfo/howitworks/fileandprint/dfsnew.asp, posted Apr. 19, 1999, 2 pages.

Spuhler, "An Analysis of NFS Protocol Version 4" Hewlett Packard, available from tom_spuhler@hp.com, 31 pages, 2001.

"Intermezzo", accessed at www.inter-mezzo.org, printed Jul. 25, 2002, 1 page.

"FiST Home Page", accessed at www.cs.columbia.edu/~ezk/research/fist/, printed Jul. 25, 2002, 2 pages.

"FAM FAQ", accessed at www.oss.sgi.com/projects/fam/faq.html, Jul. 23, 2002, 6 pages.

"Yeast: A General Purpose Event-Action", vol. 21, No. 10, IEEE, accessed at www.computer.org/tse/ts1995/e0845abs.htm, Oct. 1995, 1 page.

Anderson, et al. "Serverless Network File Systems" accessed at www.citeseer.nj.nec.com/anderson95serverless.html, 1995, 3 pages.

Zukunft, "Recovering Active Databases" accessed at www.citeseer.nj.nec.com/zukunft95recovering.html, 1995, 2 pages.

Jaeger, et al., "An Annotated Bibliography on Active Databases" accessed at www.citeseer.nj.nec.com/221310/html, 1995, 2 pages.

Fowler, et al. "n-DFS: The multiple dimensional file system", pp. 135-154, pub. John Wiley & Sons Ltd., 1994, 21 pages.

Stern, et al. "Managing NFS and NIS" Second Edition, pub. By O'Reilly, Jun. 2001, 1 page.

http://web.archive.org/web/20030213030333/www.deepfile.com/product.html, printed Aug. 21, 2007, 1 page.

http://web.archive.org/web/20030811035225/www.deepfile.com/product_auditor.html, printed Aug. 23, 2007, 2 pages.

http://web.archive.org/web/20030213231952/www.deepfile.com/product_enforcer.html, printed Aug. 21, 2007, 2 pages.

http://web.archive.org/web/20030213031244/www.deepfile.com/solutions.html, printed Aug. 21, 2007, 1 page.

http://web.archive.org/web/20030214024310/www.deepfile.com/solutions_reporting.html, printed Aug. 21, 2007, 3 pages.

http://web.archive.org/web/20030214024344/www.deepfile.com/solutions_retention.html, printed Aug. 21, 2007, 2 pages.

http://web.archive.org/web/20030410120618/www.deepfile.com/solutions_hsm.html, printed Aug. 21, 2007, 2 pages.

http://web.archive.org/web/20030214023502/www.deepfile.com/solutions_consolidation.html, printed Aug. 21, 2007, 2 pages.
http://web.archive.org/web/20030811035627/www.deepfile.com/solutions_chargeback.html, printed Aug. 21, 2007, 3 pages.
Office Action mailed Dec. 15, 2006 in U.S. Appl. No. 10/630,339, 29 pages.
Office Action mailed May 31, 2007 in U.S. Appl. No. 10/630,339, 25 pages.
Office Action mailed Nov. 1, 2007 in U.S. Appl. No. 10/630,339, 32 pages.
Office Action mailed Mar. 31, 2008 in U.S. Appl. No. 10/630,339 28 pages.
Office Action mailed Dec. 19, 2008 in U.S. Appl. No. 10/630,339, 32 pages.
Office Action mailed Oct. 2, 2007 in U.S. Appl. No. 11/262,282, 19 pages.
Office Action mailed Apr. 17, 2997 in U.S. Appl. No. 11/262,282, 18 pages.
Office Action mailed Jul. 2, 2009 in U.S. Appl. No. 11/262,282, 18 pages.
Office Action mailed Oct. 4, 2007 in U.S. Appl. No. 11/262,411, 14 pages.
Office Action mailed Mar. 4, 2008 in U.S. Appl. No. 11/262,411, 14 pages.
Office Action mailed Aug. 6, 2008 in U.S. Appl. No. 11/262,411, 13 pages.
Office Action mailed Jan. 26, 2009 in U.S. Appl. No. 11/262,411, 18 pages.
Office Action mailed Sep. 17, 2009 in U.S. Appl. No. 11/262,411, 19 pages.
International Search Report mailed Aug. 3, 2004 in PCT/US2003/024074, 4 pages, 7 pages.
Office Action mailed Sep. 25, 2007 in U.S. Appl. No. 11/262,283, 16 pages.
http://web.archive.org/web/20030810202503/www.deepfile.com/product.html, printed Sep. 11, 2007, 1 page.
http://web.archive.org/web/20030811035225/www.deepfile.com/product_auditor.html, printed Sep. 11, 2007, 2 pages.
http://web.archive.org/web/20030811035459/www.deepfile.com/product_enforcer.html, printed Sep. 11, 2007, 2 pages.
http://web.archive.org/web/20030810211526/www.deepfile.com/solutions.Html, printed Sep. 11, 2007, 1 page.
http://web.archive.org/20030811040239/deepfile.com/solutions_reporting.Html, printed Sep. 11, 2007, 3 pages.
http://web.archive.org/20030811040409/deepfile.com/solutions_retention.Html, printed Sep. 11, 2007, 2 pages.
http://web.archive.org/web/20030811040215/www.deepfile.com/solutions_hsm.html, printed Sep. 11, 2007, 2 pages.
http://web.archive.org/web/20030811035531/www.deepfile.com/solutions_consolidation.html, printed Sep. 11, 2007, 2 pages.
http://web.archive.org/web/20030811035627/www.deepfile.com/solutions_chargeback.html, printed Sep. 11, 2007, 3 pages.
Bone, Jeff, "Beberg's Question Re: What Deepfile Does," Jun. 19, 2003. http://www.xent.com/pipermail/fork/2003-June/022380.html, 3 pages.
Office Action mailed Apr. 17, 2008 in U.S. Appl. No. 11/262,283, 14 pages.
Office Action mailed Jul. 2, 2009 in U.S. Appl. No. 11/262,283, 14 pages.
Office Action mailed Jan. 2, 2010 in U.S. Appl. No. 11/262,283, 14 pages.
Office Action mailed Jan. 7, 2010 in U.S. Appl. No. 11/262,282, 13 pages.

Office Action issued in U.S. Appl. No. 11/973,846, mailed Apr. 26, 2010, 45 pgs.
Office Action issued in U.S. Appl. No. 11/262,411, mailed May 25, 2010, 24 pages.
Office Action issued in U.S. Appl. No. 11/973,846, mailed Jul. 7, 2010, 58 pgs.
Office Action issued in U.S. Appl. No. 11/973,700, mailed Jul. 26, 2010, 16 pages.
Crichlow, "An Introduction to Distributed and Parallel Computing," 1988, Simon & Schuster, pp. 1-209.
Notice of Allowance for U.S. Appl. No. 12/572,160, mailed Nov. 5, 2012, 6 pgs.
Notice of Allowance for U.S. Appl. No. 11/973,846, mailed Jul. 8, 2011, 16 pgs.
Notice of Allowance for U.S. Appl. No. 12/572,160, mailed Dec. 6, 2012, 5 pgs.
FileTek Integrates StorHouse with EMC Centera Content Addressed Storage (CAS), FileTek, Inc., Rockville, MD, Mar. 19, 2003, 1 pg., PR—EMC Centera Integration 2003, retrieved from <<http://www.filetek.com/newsandevents/pressreleases/pressreleasearchives/151>>.
EMC Centera Data Migration, Data Archive Corporation, Massapequa Park, NY, 2010, 2 pgs., printed Jan. 3, 2013, retrieved from <<http://www.dataarchivecorp.com/emc-centera-migration.htm>>.
Office Action for U.S. Appl. No. 13/301,503, mailed Mar. 12, 2013, 30 pgs.
Notice of Allowance issued in U.S. Appl. No. 11/262,411, mailed Sep. 16, 2010, 12 pages.
Office Action issued in U.S. Appl. No. 11/937,846, mailed Oct. 27, 2010, 70 pages.
Office Action issued in U.S. Appl. No. 11/973,700, mailed Nov. 9, 2010, 25 pages.
'n-DFS: The Multiple Dimensional File System' from 'configuration management': Fowler, 1994, John Wiley & Sons, 21 pages.
Office Action for U.S. Appl. No. 13/301,503, mailed Nov. 19, 2012, 28 pgs.
Office Action for U.S. Appl. No. 12/572,116, mailed May 1, 2012, 31 pgs.
Office Action issued in U.S. Appl. No. 12/572,160, mailed Mar. 15, 2011, 38 pages.
Office Action for U.S. Appl. No. 12/572,116, mailed Oct. 10, 2012, 28 pgs.
Kovar, Joseph F., "Startup Deepfile Rolls Out Storage Resource Management Software," Mar. 28, 2003, at <<http://www.crn.com/18839047/printablearticle.htm>>, 2 pgs.
Office Action issued in U.S. Appl. No. 11/973,700, mailed May 11, 2011, 26 pages.
"Scalable integration: from enterprise information management to real time process control using the metadatabase model": Schuaefer, 1994, IEEE, p. 1860-1867, 8 pages.
Katic, N., et al. "A prototype model for data warehouse security based on metadata" [online]. Computer.org 1998 [retrieved from the Internet: <http://scholar.google.com/scholar?q=%22a+prototype+model+for+data+warehouse+security$22&hl=en&as_sdt=1%2C47&as_sdtp=on>, 9 pages.
Staudt, M., et al., "Metadata management and data warehousing" University of Zurich [retrieved on Mar. 31, 2011]. Retrieved from the Internet: <ftp://ftp.ifi.unizh.ch/pub/techreports/TR-99/ifi-99.04.pdf>, 70 pages.

* cited by examiner

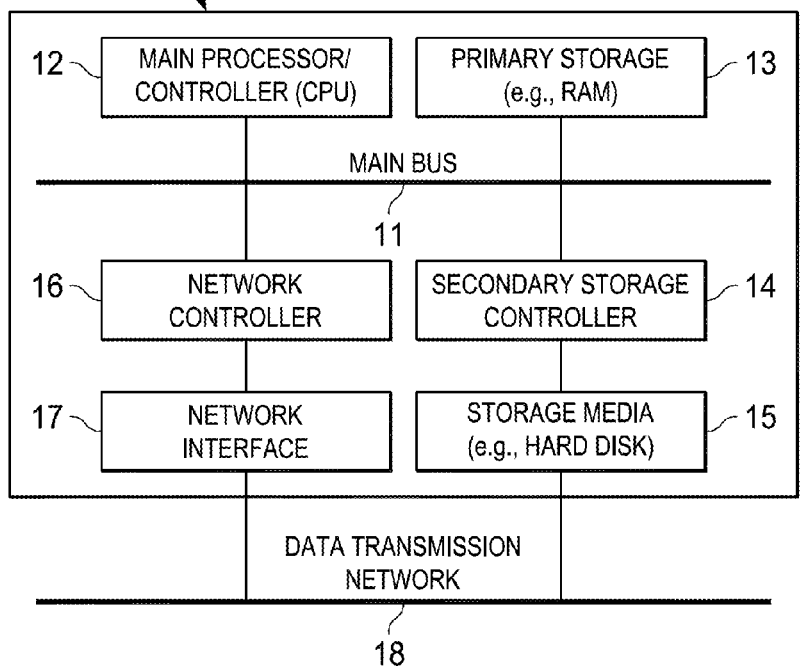
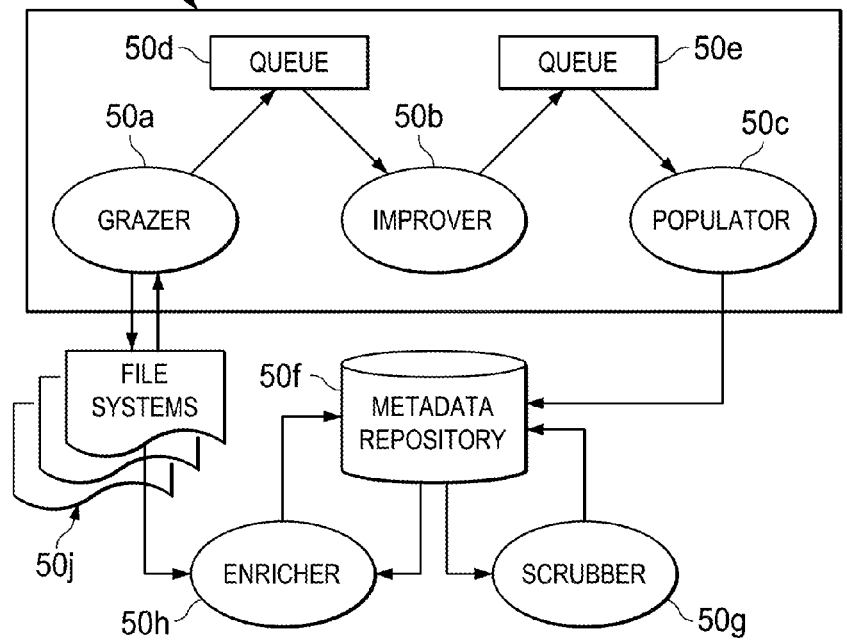

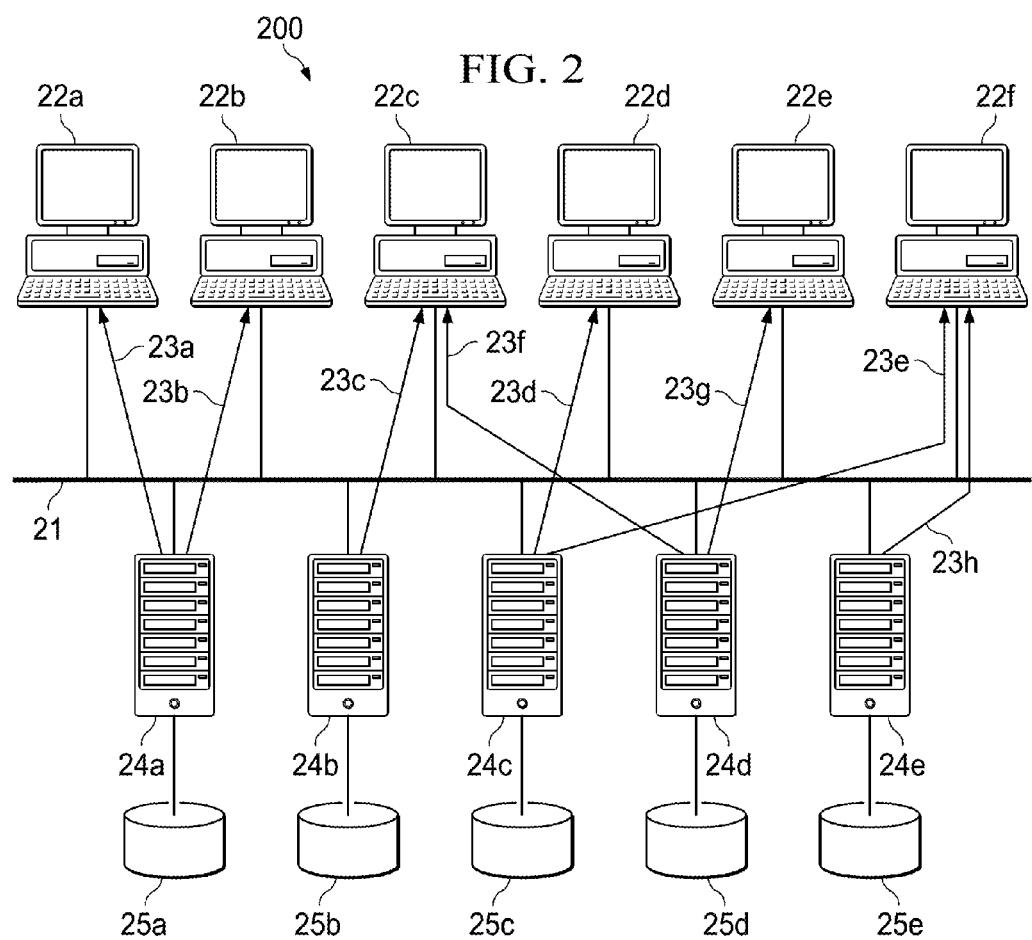

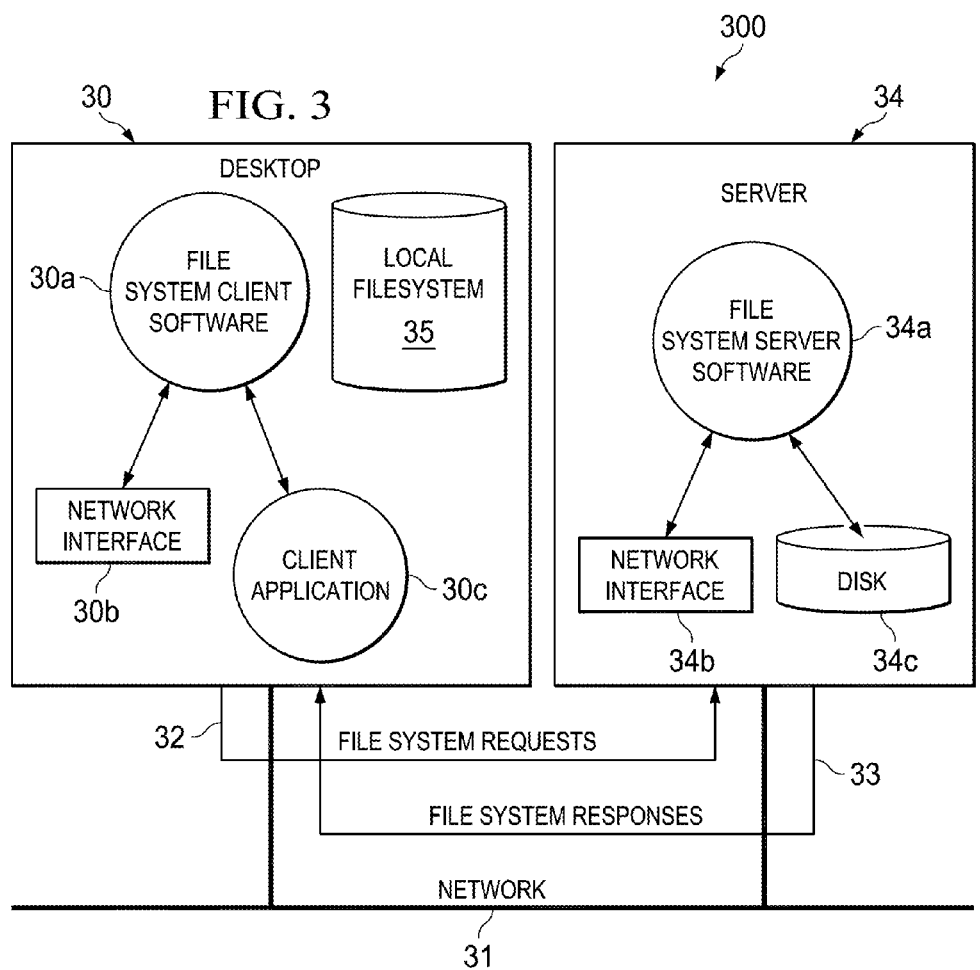

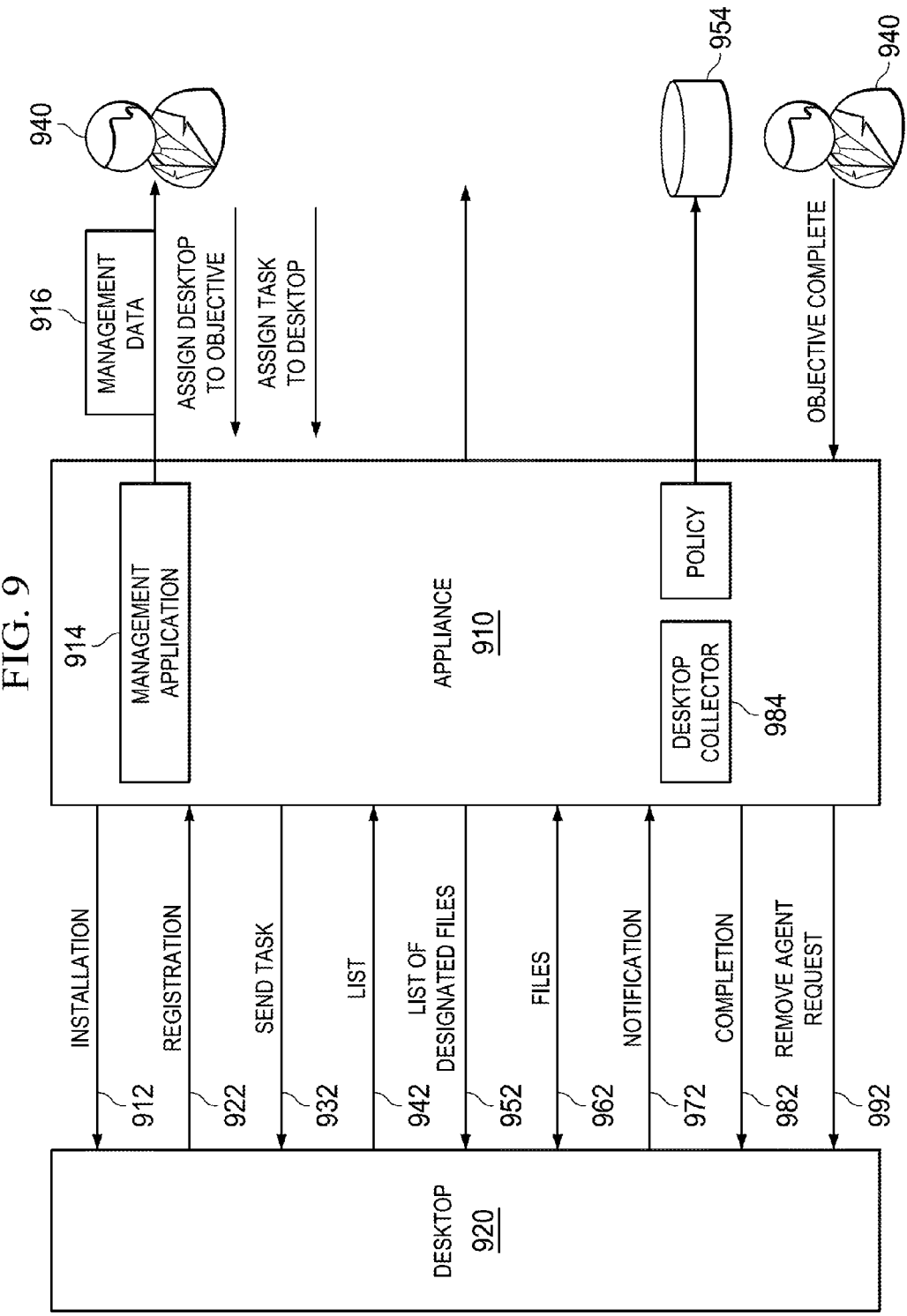

SYSTEM AND METHOD FOR A DESKTOP AGENT FOR USE IN MANAGING FILE SYSTEMS

RELATED APPLICATIONS

This application is a continuation-in-part of U.S. patent application Ser. No. 11/262,283 entitled "Method and Apparatus for Harvesting File System Metadata," filed on Oct. 28, 2005, which claims priority from U.S. Provisional Patent Application Nos. 60/622,733, 60/622,818, 60/622,820, 60/622,951, 60/622,955, 60/623,027, all of which were filed Oct. 28, 2004. This application claims a benefit of priority to U.S. Provisional Patent Application No. 61/227,180 entitled "System and Method for a Desktop Agent," filed on Jul. 21, 2009. All of the above-referenced applications are incorporated in their entirety herein by reference for all purposes.

TECHNICAL FIELD

The present invention relates generally to managing and controlling data storage resources. More specifically, embodiments of the present invention relate to managing file systems or file-based data storage. In particular, embodiments of the present invention relate to managing files in file systems or file based data storage utilizing desktop agents.

BACKGROUND

Today's computers require memory to hold or store both the steps or instructions of programs and the data that those programs take as input or produce as output. This memory is conventionally divided into two types, primary storage and secondary storage. Primary storage is that which is immediately accessible by the computer or microprocessor, and is typically though not exclusively used as temporary storage. It is, in effect, the short term memory of the computer.

Similarly, secondary storage can be seen as the long-term computer memory. This form of memory maintains information that must be kept for a long time, and may be orders of magnitude larger and slower. Secondary memory is typically provided by devices such as magnetic disk drives, optical drives, and so forth. These devices present to the computer's operating system a low-level interface in which individual storage subunits may be individually addressed. These subunits are often generalized by the computer's operating system into "blocks," and such devices are often referred to as "block storage devices."

Block storage devices are not typically accessed directly by users or (most) programs. Rather, programs or other components of the operating system organize block storage in an abstract fashion and make this higher-level interface available to other software components. The most common higher-level abstraction thus provided is a "filesystem." In a filesystem, the storage resource is organized into directories, files, and other files. Associated with each file, directory, or other file (collectively referred to herein as files) is typically a name, some explicit/static metadata such as its owner, size, and so on, its contents or data, and an arbitrary and open set of implicit or "dynamic" metadata such as the file's content type, checksum, and so on. Directories are containers that provide a mapping from directory-unique names to other directories and files. Files are containers for arbitrary data. Because directories may contain other directories, the filesystem client (human user, software application, etc.) perceives the storage to be organized into a quasi-hierarchical structure or "tree" of directories and files. This structure may be navigated by providing the unique names necessary to identify a directory inside another directory at each traversed level of the structure; hence, the organizational structure of names is sometimes said to constitute a "filesystem namespace."

Filesystems support a finite set of operations (such as create, open, read, write, close, delete, etc.) on each of the abstract files which the filesystem contains. For each of these operations, the filesystem takes a particular action in accordance with the operation in question and the data provided in the operation. The sequence of these operations over time affects changes to the filesystem structure, data, and metadata in a predictable way. The set of filesystem abstractions, operations, and predictable results for particular actions is said to constitute a "semantics" for the filesystem. While particular filesystems differ slightly in their precise semantics, in general filesystems implement as a subset of their full semantics a common semantics. This approximately equivalent common semantics can be regarded as the "conventional" or "traditional" filesystem semantics.

Storage resources accessed by some computer, its software or users, need not be "directly" attached to that computer. Various mechanisms exist for allowing software or users on one computing device to access over a network and use storage assets that are actually located on another remote computer or device. There are many types of remote storage access facilities, but they may without loss of generality be regarded to fall into one of two classes: block-level and file-level. File-level remote storage access mechanisms extend the filesystem interface and namespace across the network, enabling clients to access and utilize the files and directories as if they were local. Such systems are therefore typically called "network file systems." Note that the term "network file system" is used herein generally to refer to all such systems—there is a network file system called Network File System or NFS, originally developed at Sun Microsystems and now in the public domain. When discussing the general class of such systems herein, the lower-case term, e.g., "networked file systems" will be used. When discussing the specific Sun-developed networked file system, the fully capitalized version of the term or its acronym, e.g., "Network File System or NFS" will be used.

Networked file systems enable machines to access the filesystems that reside on other machines. Architecturally, this leads to the following distinctions: in the context of a given filesystem, one machine plays the role of a filesystem "origin server" (alternatively, "fileserver" or "server") and another plays the role of a filesystem client. The two are connected via a data transmission network. The client and server communicate over this network using standardized network protocols; the high-level protocols which extend the filesystem namespace and abstractions across the network are referred to as "network filesystem protocols." Exemplary filesystem protocols include the Common Internet File System (CIFS), the aforementioned NFS, Novell's Netware filesharing system, Apple's Appleshare, the Andrew File System (AFS), and the Coda Filesystem (Coda). CIFS and NFS are by far the most prevalent. These network filesystem protocols share an approximately equivalent semantics and set of abstractions, but differ in their details and are noninteroperable. Thus, to use a filesystem from a fileserver, a client must "speak the same language," i.e., have software that implements the same protocol that the fileserver uses.

A fileserver indicates which portions of its filesystems are available to remote clients by defining "exports" or "shares." To access a particular remote fileserver's filesystems, a client must then make those exports or shares of interest available by including them by reference as part of their own filesystem namespace. This process is referred to as "mounting" or "mapping (to)" a remote export or share. By mounting or mapping, a client establishes a tightly coupled relationship with the particular file server. The overall architecture can be characterized as a "two-tier" client-server system, since the client communicates directly with the server which "has" the resources of interest to the client.

In addition to organizing and maintaining the relationships between filesystem clients and file servers, additional challenges exist in managing access to and utilization of filesystems. While most organizations have and enforce stringent document workflow and retention policies for their paper files, similar policies—while desired and mandated—are rarely enforced for electronic files. As a non-limiting example, many corporations have a policy that prohibits the usage of corporate storage capacity on fileservers for the storage of certain personal files and content types, for instance, MP3s, personal digital images, and so on. This "policy" usually takes the form of a memo, email, etc. The administrators in charge of enforcing this policy face significant challenges. Conventional filesystems do not provide mechanisms for configuring a filesystem to only allow particular content types or otherwise make decisions about what should be stored, where, and how. These conventional filesystems are static, and the set of semantics for access and other administrative controls are rather limited. Thus any such policy enforcement that happens is done retroactively and in an ad-hoc manner via manual or mostly-manual processes. The net result is that network file storage fills up with old, duplicated, and garbage files that often violate corporate and administrative utilization policies.

In today's increasingly litigious environment and in the presence of new rules and regulations such as the Health Insurance Portability and Accountability Act of 1996 (HIPAA) and the Sarbanes-Oxley Act of 2002, the lack of management, including the inability to enforce policies consistently and effectively, represents a serious risk that corporations and businesses alike must rush to address. Unfortunately, as a direct result of the general lack of innovation and improvement in filesystem architecture over the last 30 years, viable solutions that could provide practical and effective policy management to enterprises do not seem to exist.

In a typical enterprise, the files and directories stored in the enterprise filesystems represent unstructured or semi-structured business intelligence, which comprises the work product and intellectual property produced by its knowledge workers. The work product may include business-critical assets and may range from Excel spreadsheets representing (collectively) the financial health and state of the enterprise to domain-specific artifacts such as Word documents representing memos to customers. However, in contrast to the data stored in "mission critical" information systems such as logistics systems, inventory systems, order processing systems, customer service systems, and other "glass house" applications, the unstructured and semi-structured information stored in the enterprise filesystems is largely "unmanaged." It is perhaps backed up but little or no effort is made to understand what the information is, what its relevance or importance to the business might be, or even whether it is appropriately secured.

As examples, assuming that a user 'Idunno' has stored unauthorized and illegal copies of MP3 music files in a "home directory" on some file server that belong to a corporation 'Big Corp' where Idunno works. In doing so, Idunno has perhaps violated a corporate policy of Big Corp stating that no MP3 files are to be stored on the network. However, since the "home directory" is not visible to the system managers, the system managers have no knowledge to this violation, nor any automated means of remedying the situation. Even in the event that the system managers are able to episodically inventory the filesystems for such violators, they are often loathe to automatically take appropriate actions (e.g., deleting) on such offending files. The reason is that, more often than not, while they have the responsibility for enforcing such policies, they do not have the authority to do so. To remedy this, the end-user (i.e., the file owner—in this example, Idunno) or some other responsible party must be brought "into the loop." Other examples of file management policies might include: documents relating to patients' individual medical conditions within a healthcare provider business might be stored in such a way that perhaps would violate the privacy constraints of HIPAA; or financial documents within the finance operation of a Fortune 2000 company might be stored in such a way that perhaps would violate both regulatory requirements under the Sarbanes-Oxley Act of 2002 and internal corporate governance considerations.

The pressing need to monitor filesystems and to report activities related to the filesystems presents a challenge of unprecedented scope and scale on many fronts. Filesystem activity produces changes to the state of a filesystem. This activity can affect changes to the structure, the stored metadata, and the stored data of the directories and files. Generally speaking, this activity is not logged in any way; rather, the filesystem itself holds its current state. Some filesystems—called "journaling" filesystems—maintain transient logs of changes for a short duration as a means of implementing the filesystem itself; however, these logs are not typically organized in any way conducive to monitoring and reporting on the state of the filesystem and its activity and are not made available to external programs for that purpose. Further, these logs are frequently purged and therefore provide a poor basis for reporting of historical and trend data.

One significant and open problem is that of collection, redaction, and analysis of high-level data about what a filesystem is being used for, what is stored in it, by whom and for what purpose. Solutions today involve software programs or users explicitly walking through the filesystem structure, gathering the data required, and then analyzing it and/or acting on it, etc. Collection of filesystem data proactively as operations occur is generally not done as it is generally not supported by the filesystem itself. Furthermore, the accuracy of such collected data is usually questionable, as it reflects not an instantaneous state of the filesystem at any given moment, but, rather, an approximate state of the filesystem over the duration of the run. Without collecting and maintaining the appropriate statistics as file operations occur, it is impossible for the data, at the end of the run, to represent a correct and accurate picture of the contents of the filesystem at that time.

The problem of data collection and reporting is further compounded in the network filesystem environment. Because each server—indeed, each filesystem on each server—is a separate entity, it is therefore necessary to perform each data collection independently on each server. If reporting or monitoring is to be done across the network filesystem environment, significant challenges exist; namely, because of the parallel and discrete nature of the collection runs, it becomes difficult or impossible to sensibly merge the collected data into a consistent snapshot of the state of the filesystem at some time.

It is further the case that collection and storage of all such data as it occurs could be untenably burdensome; such logs would "grow" quickly and consume additional storage capacity at an undesirable rate. The ability to both collect such data as it occurs and dynamically redact or "historize" it would allow ongoing statistics to be maintained while simultaneously constraining the total amount of storage capacity that must be dedicated to such a purpose.

Additionally, in many cases, data which may be of interest (for example, on which policies should be applied) may not reside on these networked file systems, but may instead reside only on the filesystems of desktop computer. Thus, it would be desirable to be able to collect data from these desktops. Collecting data from these desktops is not a simple matter, however. In fact, data collection from the filesystems of these desktop computers presents a variety of problems. In most cases a large portion of data on a desktop computer does not need to be collected in a given context (for example, in a litigation context, large amounts of data on a desktop computer may not conform to standards which dictate what data should be collected, such as those promulgated by the National Institute of Standard and Technology (NIST)). Furthermore, desktop computers reside in a variety of locations such as home or remote offices and may be laptop or notebook computers which frequently are off line. Furthermore, certain protocols used to communicate with these desktop machines may be inefficient when used across WANs or other networks because of latency or bandwidth problems. Further complicating these issues is the possibility that needed files may be locked or encrypted by the operating system or an application (for example, OST or PST files) and that usually only data from a small minority of the desktops in an enterprise environment may be needed.

Thus, what is desired are systems and methods which may be effectively and efficiently utilized to collect desired data from filesystems on desktop computers.

SUMMARY

To that end, attention is now directed to embodiments of just in time desktop agents, which may be used to collect desired data from specific desktop computers in a networked environment. These just-in-time desktop agents may be installed as needed to collect desired data from specified desktop computers and removed after completing one or more desired tasks. Specifically, a set of desktop computers within a particular networked environment where it is desired to install these desktop agents may be determined. Desktop agents may then be installed on only these desktops when desired. A desktop agent on a particular desktop computer may register with an appliance such as that described above and be given an objective including one or more tasks. For each of the tasks provided, the desktop agent may return a list of files which can be collected based on the classification(s) associated with that task. Specific files to collect may then be selected from the list of files such that these specific files may be sent from the desktop computer to the appliance by the desktop agent and stored. Alternatively, once the desktop agent determines a list of files which can be collected based on a particular task the desktop agent may automatically collect these files and send them to the appliance for storage. Once the tasks are completed the desktop agent may be removed from the desktop.

Certain embodiments may therefore comprise an appliance coupled to a plurality of desktop computers. A desktop agent may be provided where the desktop agent comprises a task queue for storing one or more tasks, each task associated with one or more locations in a local filesystem of a desktop, a classification and a policy action and a task pipeline operable to process a task by accessing the one or more locations in the local filesystem of the desktop associated with the task, determine one or more files in the one or more locations associated with the task and apply the policy action associated with the task to the one or more files.

Embodiments of such a desktop agent may comprise a harvester module for obtaining metadata on each of the one or more files from the local filesystem, a classification module for determining if each of the one or more files is associated with the task by determining if each file meets the classification associated with the task and a policy module for implementing the policy action.

Embodiments of such a desktop agent may be installed only on specific desktop computers within a particular environment and only when needed to accomplish specific tasks for specific objectives. Such a desktop agent may also be easily removable when the specified tasks have been completed. By using these just in time desktop agents, and targeting them to specific desktop computers a number of advantages can be achieved. First and foremost, the number of desktops on which agents are to be installed may be specified in great detail, allowing easier installs, management, support, etc. Additionally, the files to be collected may be specified in great detail and the files meeting these specifications may be refined without the need to actually send the file first.

Furthermore, as a desktop agent may have access to an appliance and associated storage, it may be possible for a desktop agent to collect files according to the same, or different, tasks, where only new, or changed, files may be collected from the desktop computer. Moreover, such a desktop agent may work in a tethered or untethered environment (for example, when desktop is off or on-line), may operate in the foreground or background of the desktop computer, may leave off or resume operation when the desktop computer is shut down or asleep, etc. By allowing such a desktop agent to expire or be removed after the desired tasks are completed in addition to the ability to target the agent to specific desktops and files a just in time agent may place less stress on a particular environment and achieve more efficient and effective operation.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 1 illustrates one embodiment of a computer system connected to a data transmission network.

FIG. 2 illustrates one embodiment of a network file system architecture,

FIG. 3 illustrates one embodiment of a 2-tier network file system software architecture.

FIG. 5 illustrates one embodiment of a harvester architecture.

FIG. 9 illustrates one embodiment of the use of a desktop agent.

DETAILED DESCRIPTION

Figure 4:
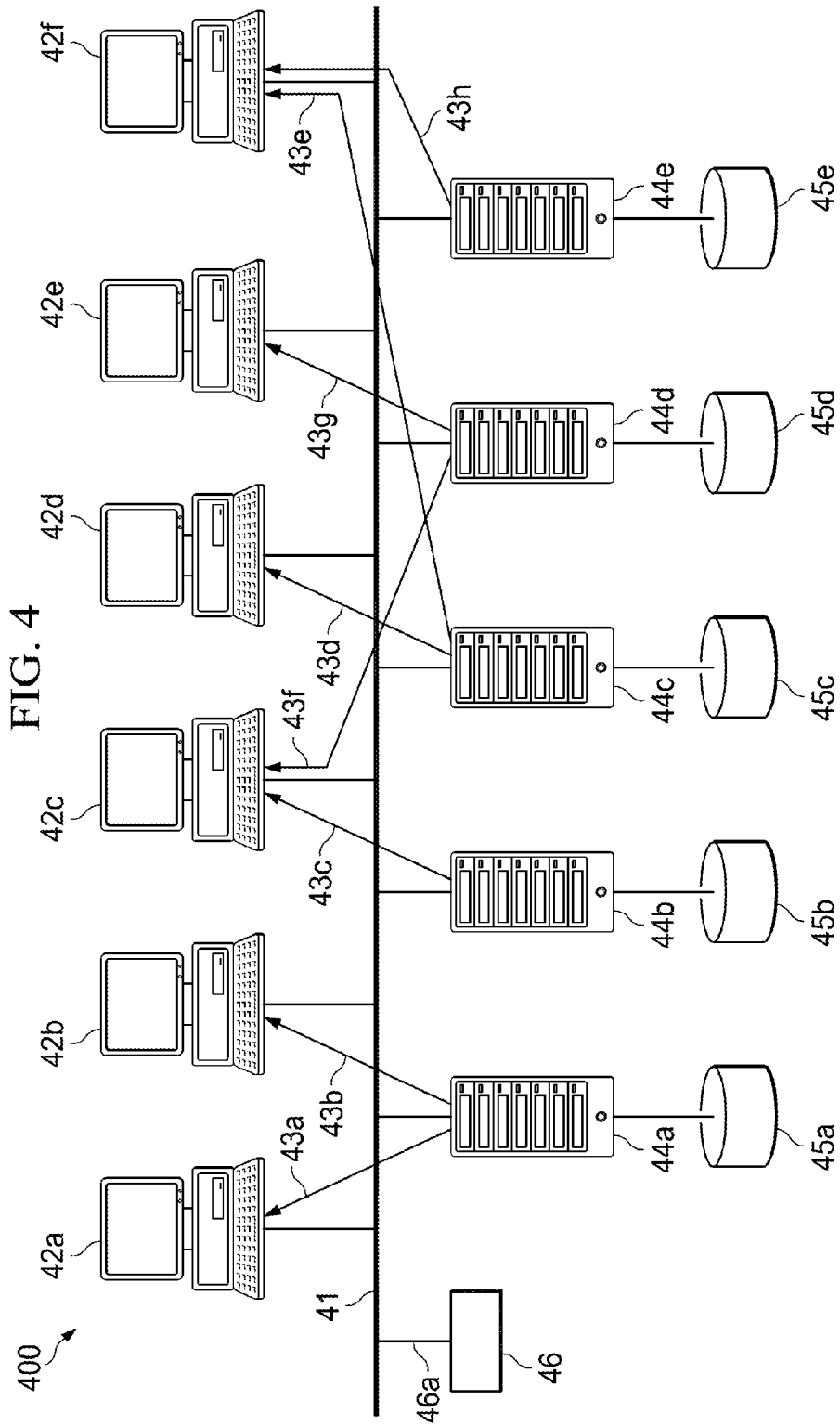
FIG. 4 illustrates one embodiment of a network file system architectural view with a file management apparatus.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example", "for instance", "e.g.", "in one embodiment".

Embodiments of the present invention can be implemented in a computer communicatively coupled to a network (for example, the Internet), another computer, or in a standalone computer. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylist, etc.), or the like. In embodiments of the invention, the computer has access to at least one database, which may local or accessed over the network.

ROM, RAM, and HD are computer memories for storing computer-executable instructions executable by the CPU or capable of being complied or interpreted to be executable by the CPU. Within this disclosure, the term "computer readable medium" or is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a DASD array, magnetic tape, floppy diskette, optical storage device, or other appropriate computer-readable medium or storage device.

In one exemplary embodiment of the invention, the computer-executable instructions may be lines of C++, Java, HTML, or any other programming or scripting code. Other software/hardware/network architectures may be used. For example, the functions of the present invention may be implemented on one computer or shared among two or more computers. In one embodiment, the functions of the present invention may be distributed in the network. Communications between computers implementing embodiments of the invention can be accomplished using any electronic, optical, ratio frequency signals, or other suitable methods and tools of communication in compliance with known network protocols.

Before describing embodiments of the present invention, it may be useful to describe an exemplary architectures and embodiments which may be utilized in conjunction with embodiments of the present invention. The systems and methods disclosed herein can be implemented in conjunction with various applications, such as a network file system management device. By way of example, FIG. 1 shows a network file system management device 10 (also referred to herein as "the device" or "the management device" or "the appliance"). In one embodiment, the management device is embodied in a computer system programmed with at least one software component or software system, which is described in greater detail below and which is executable by a central processor unit (CPU) 12 of computer system 10. Computer system 10 may embody the various components of the management device and subsystems with which it interacts.

In this example, computer system 10 embodying the management device comprises a main bus 11, a main processor 12, a primary storage 13, a secondary storage controller 14, a storage media 15, and optionally a network controller 16, a network interface 17, and a data transmission network 18. Other devices which may be connected to or form part of computer system 10 may include display, mouse, keyboard, and so on. Main processor 12 can be a general purpose processor, a limited processor such as an application-specific integrated circuit (ASIC) or microcontroller, or any other instruction execution machine. Primary storage 13 provides a transient memory or storage space for use by programs executing on main processor 12. Main processor 12 communicates with primary storage 13 in a conventional manner.

Main processor 12 communicates with secondary storage controller 14 by way of main bus 11. Secondary storage controller 14 connects storage media 15 to main processor 12 by way of main bus 11. Storage media 15 may be a hard drive, compact disc read only memory (CD-ROM) drive, floppy drive, tape drive, optical storage medium, or other storage device. Secondary storage controller 14 is used to read and/or write storage media 15 on behalf of main processor 12.

Computer system 10 may communicate with other computers by way of a data transmission network 18. This is accomplished by attaching a network interface 17 to data transmission network 18, attaching network interface 17 to network controller 16, and connecting network controller 16 to main bus 11. Software running on main processor 12 may then access other computers across data transmission network 18 in any of the conventional ways, e.g., by executing "protocols" which affect the transmission and reception of protocol data units, packets, etc. over data transmission network 18.

According to one embodiment of the invention, the software component(s), which can be stored in memory of various forms, of the management device operates to cause computer system 10 to perform the following functions: collecting data on files or files themselves; deploying and managing agents on remote systems which may collect data on files or the files themselves and communicate such data back to the appliance; harvesting file and directory metadata from file systems; allowing reporting and ad hoc query functions over harvested metadata; providing a mechanism that defines file management policies over managed storage(s) and that enables automated execution of such policies; allowing such policies to trigger arbitrary actions which may change the state of the managed storage(s), such as, and without loss of generality, deleting files, compressing files, moving files, "flagging" files for backup, checking files into a document management system, indexing files for use in content search, generating reports, executing policies, and so on; and providing a workflow model which allows human users to be included in the file management workflow such that they may be prompted for their approval before any given action are taken to bring the managed storage(s) into compliance with defined policies.

A skilled artisan will recognize that in addition to embodiments shown and described with reference to the drawings disclosed herein, other embodiments are possible. In particular, it is possible to compose components/subsystems described herein in various ways, for example, disabling certain of the functions above. One embodiment described herein can address these functions substantially simultaneously. However, it should be understood that each of the subsystems (and each of the functions) are independent of one another and embodiments of the invention can comprise a number of subsystems running any subset of these functions or others. Moreover, it should be noted that each of the functions above and their corresponding subsystems and/or software implementations need not reside on a single computer. They can be distributed across multiple distinct computers according to embodiments of the invention.

FIG. 2 is a block diagram representation of a 2-tier network file system architecture 200 comprising a data transmission network (or network) 21, a plurality of servers 24a-24e, a plurality of storage media devices with file systems 25a-25e attached to servers 24a-24e, and a plurality of desktop computers 22a-22f. The network file system itself is represented as connections or "mounts" 23a-23h. Each of the mounts 23a-23h is understood to be a logical rather than physical connection between the associated server and one or more of the desktop machines. More precisely, this connection is understood to be the logical relationship between some part or all of the relevant file systems attached to the associated server machine and shared out over a certain network file system protocol (explained further below) and the associated client machine's own file system software. It will be noted that a desktop computer 22 may not be coupled to network 21 and not be associated with a "mount" 23 or file systems 25 for any of a number of reasons.

FIG. 3 is a block diagram depicting the software architecture 300 of a 2-tier network file system, as illustrated by a single desktop-server pair. It comprises a desktop computer (or client) 30 a data transmission network 31, and a network file system server machine (or server) 34 (e.g., a computer). In this embodiment, desktop 30 includes a local filesystem 31 comprising storage media, for example, a fixed drive (such as a hard disk) or a removable drive (such as a USB drive), an optical drive (e.g. a DVD or CD drive), etc. The local filesystem 35 of the desktop computer 30 may contain a variety of files which may or may not be duplicated in the networked file system. These files may be, for example, user files, system or application files (for example, operating system files or local cache) or a wide variety of other types of files. Desktop computer 30 may also include file system client software 30a, network interface 30b, and client application 30c. Desktop 30 and server 34 communicate with each other over network 31 by exchanging file system requests 32 and responses 33. The rules by which such an exchange occur are known as a network file system protocol. There can be arbitrarily many such network file system protocols. Embodiments of the present invention are independent of and thus not limited by any particular network file system protocol.

When client application 30c wishes to access a storage medium, for example, disk 34c, located on server 34, file system client software 30a can intercept this request and direct it over network 31 to server 34, thereby generating a request 32. Network interface 34b of server 34 receives this request and directs it to file system server software 34a, which may then perform the requested action on disk 34c. Upon completion of the requested action, server 34 constructs a response 33 and directs it back to the sender (desktop 30) via network 31. Network interface 30b of desktop 30 receives this response and directs it to file system client software 30a, which in turn responds to the waiting client application 30c, thus completing a network transaction.

FIG. 4 is a block diagram representation of a 2-tier network file system architecture 400 comprising a data transmission network (or network) 41, a plurality of servers 44a-44e, a plurality of storage media devices with file systems 45a-45e attached to servers 44a-44e, and a plurality of desktop computers 42a-42f. The network file system itself is represented as the connections or "mounts" 43a-43h. In this embodiment, a file system management device or devices 46 are attached to network 41 via line 46a and may themselves mount and access any of the file systems served by servers 44a-44e in the same manner and at any time as any of the mounts 43a-43h accesses clients 42a-42f. Furthermore, devices(s) 46 may access each of desktop computers 42a-42f over network 41. Device(s) 46 may implement all or any combination of the functions listed above, more details of which will now be described.

In one embodiment, the file system management device is configured with a software component referred to as a "harvester" for harvesting file and directory metadata from network file systems in a fast and efficient manner. FIG. 5 is a block diagram depicting one embodiment of a system 500 comprising a harvester 50, file systems 50j, and a metadata repository 50f. Harvester 50 in this embodiment comprises several discrete components, including a grazer 50a, an improver 50b, a populator 50c, a queue (or grazer-improver queue) 50*d* connecting grazer 50*a* and improver 50*b*, and a queue (or improver-populator) 50*e* connecting improver 50*b* and populator 50*c*.

It should be understood that components 50*a*-50*e* of harvester 50 may reside at one computer system (e.g., computer system 10) or more than one computer as described above with reference to FIG. 1. For example, queues between remote components could be configured to support some remote network interface capable of transmitting and receiving data across data transmission networks. Such a remote network interface can take many forms including industry-standard remote procedure call (RPC) protocols, hypertext transfer protocol (HTTP), Common Object Request Broker Architecture (CORBA), Distributed Component Object Model (DCOM), and so on. CORBA and DCOM are designed to support objects created in any language.

FIG. 5 illustrates the interactions between harvester 50 and file systems 50*j* in the process of "harvesting" metadata from file systems 50*j*, according to one embodiment of the invention. In this example, grazer 50*a* interacts with file systems 50*j* to receive its file metadata. In this embodiment, the metadata is "canonicalized" (i.e., transformed into a common representation, for example, attribute-value pairs, extensible markup language (XML), or any other suitable data representation that is understood by improver 50*b*). Each metadata "record" (i.e., a set of attributes associated with a file or directory that is being "grazed") is placed in queue 50*d*. FIG. 5 also shows the interactions between harvester 50 and other system components of system 500, particularly with regard to concurrency. In this embodiment, grazer 50*a*, improver 50*b*, and populator 50*c*, each runs in its own thread, asynchronously and concurrently with one another. These subcomponents are loosely coupled and coordinated by way of queues 50*d*-50*e* and by way of their "parent component" (i.e., harvester 50) process lifecycle and context.

In this embodiment, improver 50*b* operates to synthesize or calculate any desired attributes that may be computed from the raw metadata collected by grazer 50*a*. As improver 50*b* reads content out of queue 50*d*, it can improve, if necessary, the set of attributes associated with each metadata record for each file or directory. Improver 50*b* is configured to perform a plurality of computations including checksums, hashes, basic file typing, and so forth. In one embodiment, all operations that interact with the file content directly are performed via improver 50*b* to take advantage of cache locality on the file server. Upon completion of "improvement" of each file or directory metadata, the transformed metadata record is placed in queue 50*e*.

According to the embodiment shown in FIG. 5, populator 50*c* reads the improved metadata records from queue 50*e* and inserts them into a metadata repository 50*f* according to some scheduling heuristic. In one embodiment, this is done in a batch fashion so that a plurality of insertions can be combined into a single bulk upload to amortize the cost of the database operation across many metadata records. Other methodologies can also be used.

In one embodiment, a scrubber 50*g* may be included to read the metadata repository 50*f* and make judgments about the "freshness" of the data in the metadata repository 50*f* on an item-by-item basis. Depending upon the freshness of each item, scrubber 50*g* may determine when to deprecate, expire, or otherwise garbage collect metadata.

In one embodiment, an enricher 50*h* may be included to perform metadata collection tasks: (a) that are likely to be lengthy and/or performance intensive, (b) that require interaction with the file system or other external system in some idiosyncratic fashion, and (c) whose purpose is the collection of "optional" metadata which is not required for the normal or baseline functioning of the system. Examples might include: high-level semantic classification of certain document types, full-text indexing of suitable documents, etc. In such cases, enricher 50*h* may retrieve a list of enrichment candidates from metadata repository 50*f*, perform one or more desired enrichment operations, and update the associated metadata in metadata repository 50*f*.

Accordingly, using embodiments of the above described appliance data may be collected from file systems in a network substantially without using agents. In fact, usually data may be collected from these file systems using only backup permissions. In many cases, however, data which may be of interest may not reside on these networked file systems, but may instead reside only on desktop computers. Thus, it would be desirable to be able to collect or manipulate (referred to collectively herein as "collecting") data from these desktops (used herein to refer to any computer from which it is desired to collect data that is not a networked file server) in a similar manner to the collection which occurs with respect to embodiments of the appliance described above.

Collecting data from these desktops is not a simple matter, however. Desktop computers reside in a variety of locations such as home or remote offices and thus these desktops may be networked using, for example, a wide area network (WAN) or the like. Furthermore, certain protocols used to communicate with these desktop machines may be inefficient when used across WANs or other networks because of latency or bandwidth problems. Thus, collecting data from these desktops using an application operating on a centralized or remote location such as an appliance may be inefficient. It is consequently desired to have simple and effective methods for collecting or otherwise manipulating data from these desktop computers.

To that end, attention is now directed to embodiments of desktop agents, which may be used to collect desired data from specific desktop computers in a networked environment. Specifically, desktop agents may be deployed on one or more desktop computers. A particular desktop agent may register with an appliance such as that described above and be provided with one or more tasks. For each of the tasks provided, the desktop agent may return a list of files which can be collected or otherwise manipulated based on the classifications associated with that task. Specific files to collect or manipulate may then be selected from the list of files such that these specific files may be sent from the desktop computer to the appliance by the desktop agent and stored, or the files otherwise manipulated on the desktop computer. Alternatively, once the desktop agent determines a list of files which can be collected or manipulated based on a particular task, the desktop agent may automatically collect these files and send them to the appliance for storage.

Figure 6:
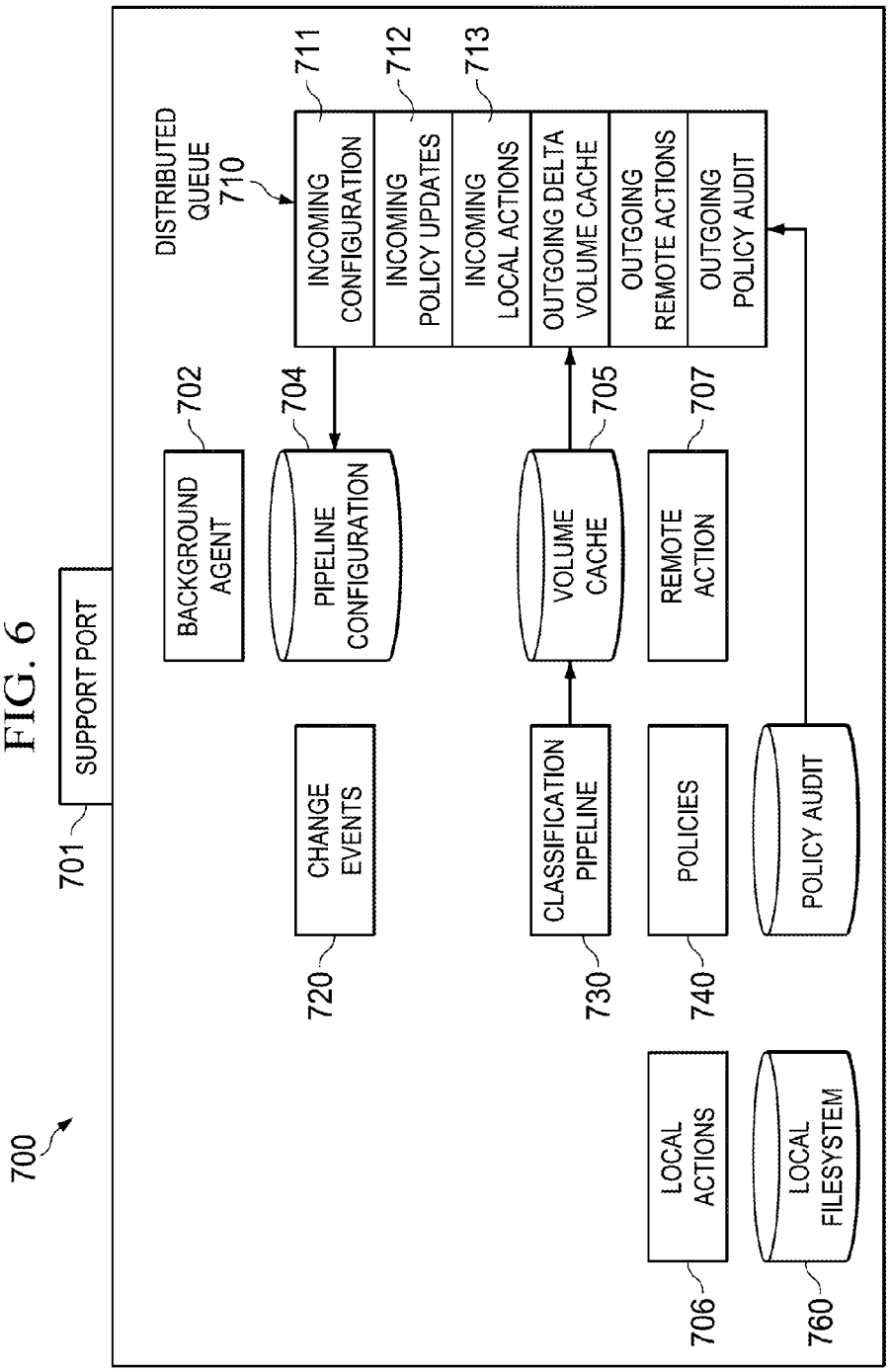
FIG. 6 illustrates one embodiment of a desktop agent.

Turning first to FIG. 6, a block diagram showing one embodiment of an architecture for a system for use of a desktop agent is depicted. In this embodiment, system 700 comprises a support port 701, a background agent 702, and a distributed queue 710. Agent 702 receives incoming configuration 711 via distributed queue 710 and stores incoming configuration parameters and/or values in pipeline configuration 704. Incoming policy updates 712 and incoming location actions 713 may also be placed in distributed queue 710, which may trigger change events 720. As an example, agent 700 can run change events 720 through file classification pipeline 730, stores new/updated file classes in volume cache 705, and place changes (delta) to distributed queue 710. Policies 740 that are affected by change events 720 through file classification pipeline 730 may cause local actions 706 to be taken on local filesystem 760 and cause, via distributed queue 710, remote actions 707 to be taken on a remote volume (not shown). Historical data can be stored in policy audit 750 and/or placed in distributed queue 710 for later use in audit trails.

Figure 7:
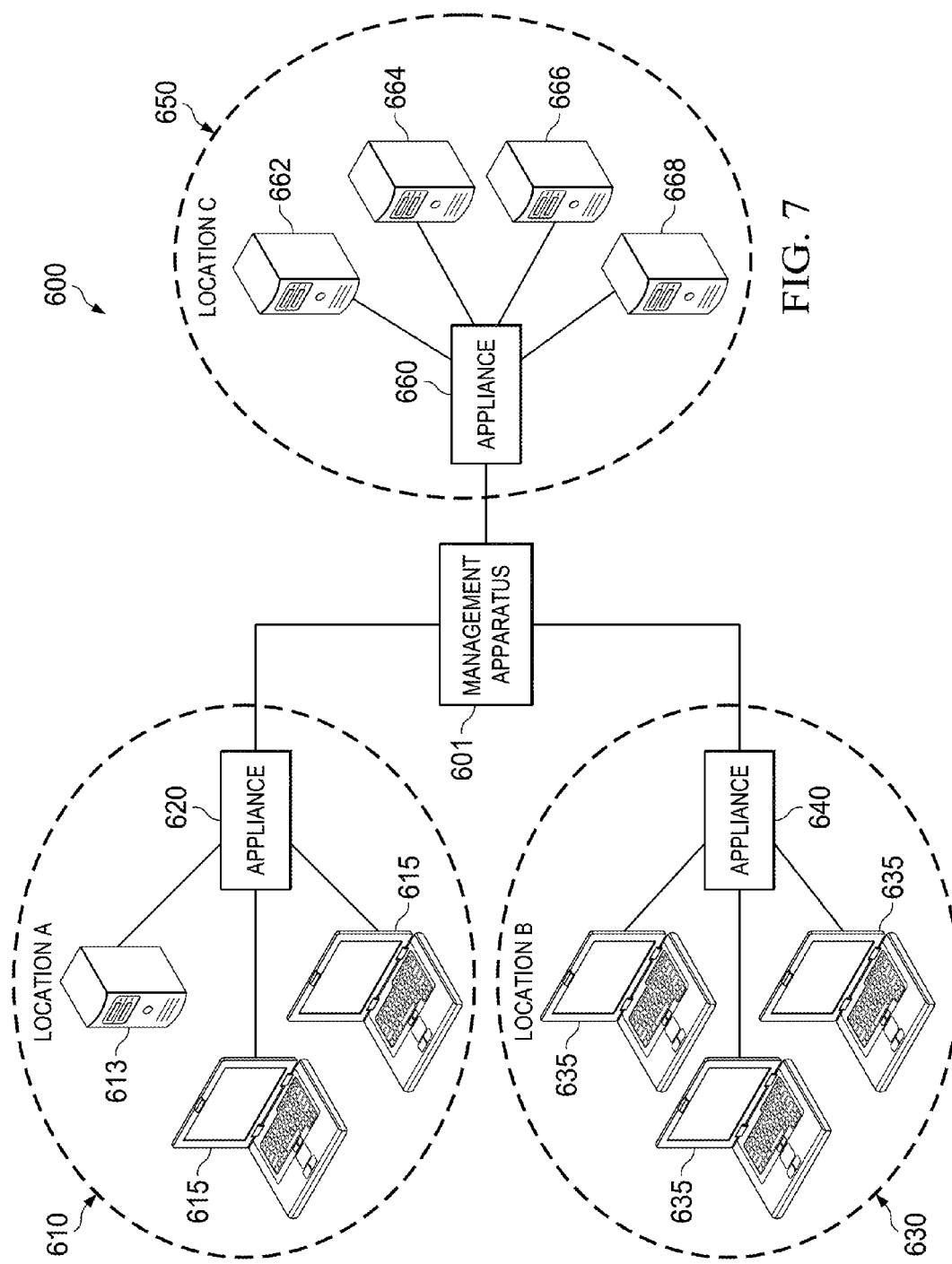
FIG. 7 illustrates one embodiment of a distributed enterprise environment where embodiments of the invention may be implemented.

Moving now to FIG. 7, one embodiment of a distributed enterprise computing environment 600 where such desktop agents may be effectively utilized is depicted. Enterprise computing environment 600 comprises a plurality of computer systems 610, 630, 650 residing at various locations (e.g., locations A, B, C), and a policy management apparatus 601 (that may include an external hold platform or file repository) coupled to the plurality of computer systems. As an example, location C can be the main location from where the affairs of an organization are directed (e.g., corporate headquarters) and locations A and B can be field locations (e.g., satellite offices). In this example, each computer system 610, 630, 650 at each location A, B, C comprises an appliance 620, 640, 660, respectively, to distribute control over information (including metadata or files) gathered at each location correspondingly.

In the example shown in FIG. 6, system 650 at location C may comprise a plurality of servers such as e-mail server 662, file servers 664, 666, and retention (archive) server 668. These file servers may utilize a variety of file system protocols. Location A may comprise an appliance 620, a file server 613 and desktop computers 615. Location B may comprise appliance 640, and desktop computers 635. In one embodiment, some components utilized in file management may be deployed to desktop systems (e.g., 615, 635) through a corresponding local appliance (e.g., 620, 640). These components, referred to as a desktop agent may perform management functionality such as that detailed above.

Figure 8:
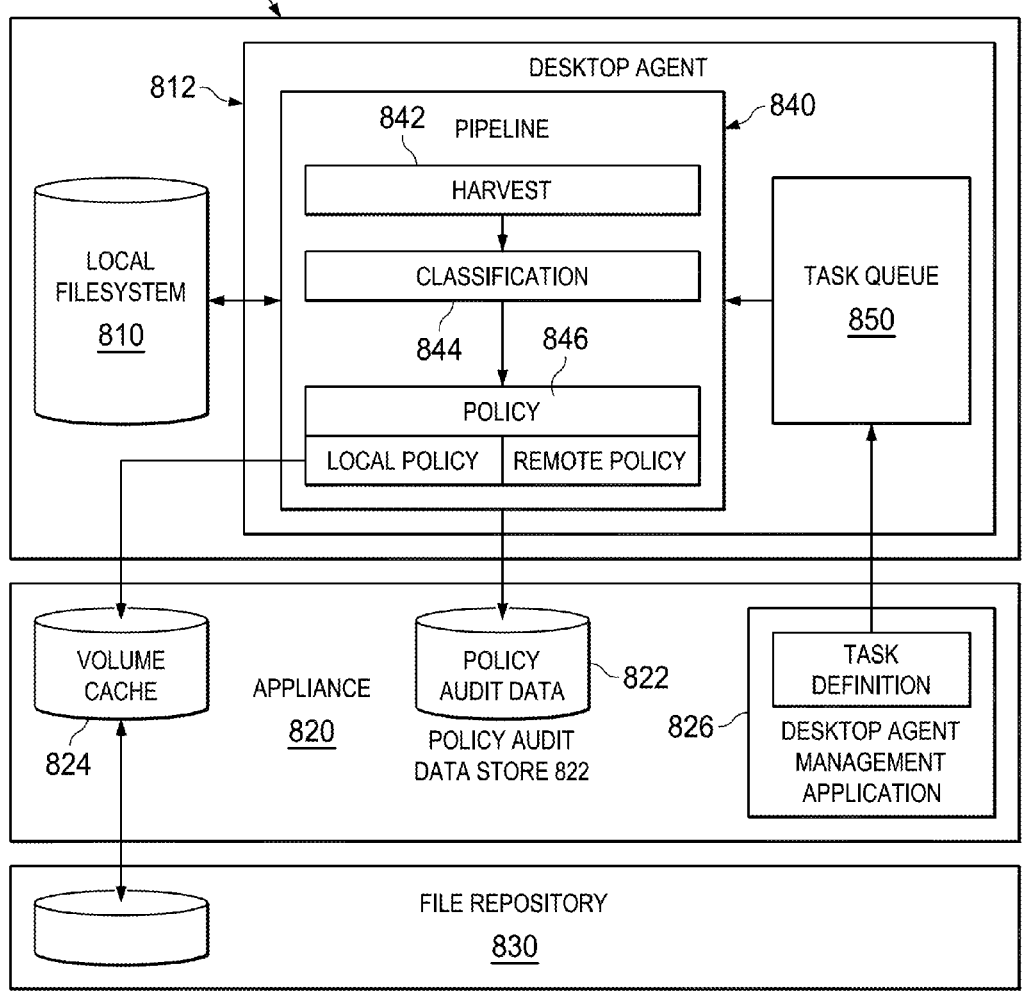
FIG. 8 illustrates one embodiment of an architecture where one embodiment of a desktop agent may be deployed.

Thus, using a desktop agent deployed on a desktop computer files, file metadata or filesystem metadata may be obtained, classifications made and policies implemented. FIG. 8 depicts one embodiment of an architecture for desktop agents and their deployment. A desktop computer 800 may include a local filesystem 810 which may include for example, one or more data stores such as a fixed drive, a removable drive which store data files, a DVD drive or another type of computer readable storage medium. The desktop computer 800 may be coupled to an appliance 820 that is, in turn, coupled to an external hold platform or file repository 830 that may be part of a policy management apparatus as discussed above.

Desktop agent 812 may be deployed on desktop computer 800. For example, desktop agent 812 may comprise computer instructions residing in a computer readable memory of desktop computer 800 and executing as a background process on the processor of desktop computer 800. Desktop agent 812 may comprise a task queue 850 and a task pipeline 840 including a harvest module 842, a classification module 844 and a policy module 846.

Harvest module 842 may be operable to harvest file or filesystem metadata and or actual content of files, from local file system 810 or to determine improved metadata as discussed above. Classification module 844 may be operable to classify a file in local file system 810 according to a set of classification parameters, where the classification parameters may include parameters associated with file or filesystem metadata, improved metadata or content of the file. The classification module may thus determine if a file meet the classification associated with a task by evaluating at least a portion of the metadata associated with the file. Embodiments of such a harvester module or classification module are described in U.S. patent application Ser. No. 10/630,339 entitled "Method and Apparatus for Managing File Systems and File-Based Data Storage" filed on Jul. 30, 2003; U.S. patent application Ser. No. 11/262,282 entitled "System, Method and Apparatus for Enterprise Policy Management" filed on Oct. 28, 2005; U.S. patent application Ser. No. 11/524,831 entitled "System and Method for Classifying Objects" filed on Sep. 21, 2006; U.S. patent application Ser. No. 11/262,411 entitled "System and Method for Involving Users in Object Management" filed on Oct. 28, 2005; and U.S. patent application Ser. No. 11/645,205 entitled "Browser-Based System and Method for Defining and Manipulating Expressions" filed on Dec. 22, 2006, all of which are hereby incorporated by reference for all purposes.

Policy module 844 may be operable to implement one or more policy actions on files in the local file system 810 based on the classification assigned by classification module 842. Policies may include one or more expressions and one or more associated actions. The expressions may be evaluated and the one or more associated actions taken based on the outcome of the evaluation. The expression may, for example, be a Boolean expression involving one or more classifications, such that if the Boolean expression evaluates to "True" the one or more associated actions may be taken. The actions may include local or remote actions, for example, deleting a file in the local file system 810, copying the file to an external location for storage (such as hold platform/file repository 830) or placing a hold on a copy of the file existing in an external storage location (such as hold platform/file repository 830) such that the file may be preserved in the external storage location. To give a concrete example, a policy may instruct the desktop agent that "if a file is an .mp3 file, delete the file," or "if the file is a .pst file copy the file to the external hold platform/file repository."

To interact with desktop agent 812, appliance 820 may comprise a policy audit data store 822, a volume cache 824 and an desktop agent management application 826 which allow an administrator to interact with desktop agent 812 (or, for example, with all, or a subset of, desktop agents installed on any or all desktop computers coupled to appliance 820). Using this desktop agent management application 826, an administrator may configure desktop agent 812 or receive information provided by desktop agent 812. Using this desktop agent management application 826, then, an administrator may define one or more tasks which may be assigned to desktop agent 812 where it is stored in the task queue 850 of that desktop agent 812. In one embodiment, such a task may be operable to implement at least a portion of a policy and comprise a classification definition defining files to which the task applies, a directory scope defining the areas of a local file system on a desktop computer on which the task may be performed, the type of policy action associated with the task (for example, whether a delete, copy or hold action should occur), or other data associated with a task.

In operation then, once a task is defined it may be sent to the desktop agent 812 on desktop computer 800 where it is placed in the task queue 850 of that desktop agent 812. The desktop agent 812 may obtain a task from the task queue 850 (which may be a list, a FIFO queue, etc.) and process the task. In some embodiments, desktop agent 812 may be operable to process multiple tasks substantially in parallel.

Processing a task may comprise determining which areas of the local file system 810 are associated with task, harvesting the metadata or content associated with the files in those areas of the local filesystem 810, classifying the files according to the classification definition associated with the task, evaluating any policies associated with the task and carrying out any of the actions associated with the policy on any files which meet the classification definition. More specifically, in certain embodiments, harvester module 842 may determine metadata associated with each of the files in the areas of the local filesystem 810 associated with the task. The classification module 844 may use the metadata for the file to determine if the file meets any of the classifications associated with the task and if so, the policy module 846 may implement the action(s) associated with the task. If any of the files are to be copied they may be sent to volume cache 824 on appliance 820. These files may then be copied at a later time to the data store on the external hold platform or file repository 830 or a hold placed on these files, where a hold may indicate that the file or metadata corresponding to a file is not to be deleted for a specified time period.

As noted above, in some cases certain files in the local filesystem 810 of a desktop may be locked by certain applications, may be encrypted, or may otherwise be difficult to access. Accordingly, in some embodiments, before accessing files in the local filesystem 810 a snapshot of data in the local filesystem 810 may be created on desktop 810 such that the harvester module 842, classification module 844 or policy module 846 may operate on these files in the created snapshot, circumventing locking mechanisms which may be utilized with the original files. This type of snapshot may be created, for example, using the shadow copy service provided by Microsoft. Similarly if certain files are encrypted the desktop agent 812 may utilize the local user identification of a desktop user which may be provided by the desktop management application 826 to the desktop agent 812, desktop agent 812 may impersonate a user that has an open session on the desktop computer or desktop agent 812 may act as an enterprise wide key authority such that the encrypted files may be decrypted before they are processed.

While a desktop agent may permanently reside on each desktop from which it might eventually be desired to collect data and these desktop agents may be configured to collect data from certain locations on the local file system (for example, Outlook files (PST, etc.), MyDocuments, etc.), this solution may be problematic as the IT managers in charge of such networks, companies, etc. may not want to install agents on these desktops because of support, maintenance or other issues. Additionally, such an installation may not be feasible in larger entities as there may be tens of thousands of desktops (or more) on which such desktop agents would need to be installed. Moreover, even if such desktop agents were installed, in many cases only 5-15% of data on a given computer is usually desired, thus even collecting all data from only specific location may be inefficient.

To that end, attention is now directed to embodiments of just in time desktop agents, which may be used to collect desired data from specific desktop computers in a networked environment. These just-in-time desktop agents may be installed as needed to collect desired data from specified desktop computers and removed after completing one or more desired tasks. Specifically, a set of desktop computers within a particular networked environment where it is desired to install these desktop agents may be determined. Desktop agents may then be installed on only these desktops when desired. A desktop agent on a particular desktop computer may register with an appliance such as that described above and be given an objective including one or more tasks. For each of the tasks provided, the desktop agent may return a list of files which can be collected based on the classification(s) associated with that task. Specific files to collect may then be selected from the list of files such that these specific files may be sent from the desktop computer to the appliance by the desktop agent and stored. Alternatively, once the desktop agent determines a list of files which can be collected based on a particular task the desktop agent may substantially automatically collect these files and send them to the appliance for storage. Once the tasks are completed the desktop agent may be removed from the desktop.

Embodiments of such desktop agents may be better understood with reference to FIG. 9, which depicts one embodiment of an architecture in which a desktop agent may be deployed. Such an architecture may include an appliance 910 such as that discussed above, a desktop computer 920 coupled to the appliance 910 and storage 930 which may for example, reside at a location such as an external hold platform or file repository. Using a desktop agent management application 914 offered by the appliance 910, an administrator may define one or more tasks and objectives. As discussed above, task may comprise a classification definition defining files to which the task applies, a directory scope defining the areas of a local file system on a desktop computer to be associated with the task, the type of policy associated with the task (for example, whether a delete, copy or hold policy action should occur) or other data associated with a task. Objectives may be a goal to be achieved through the execution of various tasks associated with the objective and may serve as a contextual grouping for one or more tasks which the administrator may associate with the objective. As can be seen then, a task may be associated with multiple objectives.

Initially, then, a collections administrator 940 may determine a set of desktop computers on which it is desired to install desktop agents. This determination may be made based on almost any criteria desired. For example, in one embodiment, in a litigation context it may be desired to collect certain files from the desktops of certain people's computers. Thus, it may be desirable to install desktop agents on these people's desktop computers.

Once it is determined that a desktop agent is to be installed on a particular desktop computer 920, the desktop agent may be installed on the desktop computer 920 at step 912. This installation may be accomplished in almost any manner desired. For example, in one embodiment a desktop installation service could be utilized with a Systems Management System (SMS) server and tied into an active directory such that when a particular user logs into the network the desktop installation service installs the desktop agent on the user's desktop. In another embodiment, the desktop agent could be a Microsoft Installer Package (MSI) file for installation on desktop which is used, for example, with an email as an attachment provided by another type of server, etc. Other ways of installing a desktop agent are contemplated, for example, an administrator may manually install a desktop agent on each desktop computer using a computer readable medium such as a USB drive, compact disc, etc.

During the installation of a desktop agent, the desktop agent may be configured to operate in a certain manner. This configuration may be accomplished, for example, by utilizing one or more flags in conjunction with the installation process such that by using these flags or other arguments during installation the desktop agent may be configured in a particular manner. For example, the desktop agent may be configured to execute as a background process such that a user may not be aware of its execution or may be configured to execute in the foreground to make a user of the desktop computer aware of its presence. Similarly, the desktop agent may be configured to have a relatively higher or lower priority relative to other applications on the desktop computer such that the priority may be used in determining when or how to execute the desktop agent depending on other applications executing on the desktop computer. Similarly, the desktop agent may be configured to automatically perform a predefined set of tasks. For example, the desktop agent may be pre-configured with one or more tasks such that when the desktop agent is installed on the desktop computer it may begin performing the tasks without being activated or being assigned those tasks remotely. Other types of configuration are also contemplated.

Once the desktop agent is installed on the desktop computer 920 it may register with the appliance 910 at step 922. This registration process may entail providing identification information to the appliance (for example, the desktop agent management application 914). This identification information may, in one embodiment, comprise information which may uniquely identify the desktop computer on which the desktop agent is installed, or which may uniquely identify the desktop computer with respect to other computers coupled to the appliance. Such identify information may include, for example, at least a portion of the configuration of the desktop computer (for example, number and type of drives, directory structures or other data pertaining to the configuration of the desktop computer, an IP or other type of network address, etc.), a hash based on the bios serial number or the serial number of the motherboard on the desktop computer or the hostname of the desktop computer.

Thus, once a desktop agent on a desktop computer has registered with the appliance 910, the desktop agent management application 914 may present the administrator 940 with management data 916 including, for example, a list of desktop computers on which a desktop agent has been installed, the configuration of those desktops, a list of tasks, a list of objectives and tasks associated with each of the objectives, etc. The desktop agent management application 914 may also allow an administrator 940 to associate tasks with objectives and desktop computers with objectives or tasks. When a desktop computer is associated with an objective, for example, tasks associated with that objective may be sent to the desktop computer.

At step 932 then, a specific task associated with a particular objective may be sent to the desktop agent on the desktop computer 920. In some cases, if a desktop computer 920 has been associated with an objective all the tasks associated with that objective may be sent to the desktop computer 920. A task may designate which types of files to look for through a classification, where to look for those files (for example, in what portions of the local filesystem of the desktop computer) and any actions to take on the located files (for example, policy actions that include delete, copy or hold). Based on this task at step 942 a list of files in the portion of the local filesystem of the desktop computer 920 designated by the task that have been identified according to the classification specified by the task can be sent to appliance 910.

In one embodiment, this list of files may comprise hash values associated with the files identified by a classifier of the desktop agent such that the entire file does not need to travel across the network. Additional information may also be returned by the desktop agent, including the amount of data associated with the task, the total size of data, total number of files, enumeration of all the files to be collected summarized by file type or file categories or other type of information on identified files.

From this list, one or more files may be designated to be collected, for example, by administrator 940 and the list of designated files to be collected may be sent back to the desktop agent on the desktop computer 920 at step 952. Designation of these files may be done on an individual file basis, by category of files, location of files, all files, etc. In one embodiment, where a list of hashes of files is returned by the desktop agent these hashes may be used to determine data which may or may not need to be collected. These hash values can be compared to hash values provided by National Institute of Standards and Technology (NIST) to determine those files which may have been created by an operating system, are internal to applications, are shipped with commercial software packages, etc. Thus if a returned hash value corresponding to a file on the desktop computer is found within the list provided by NIST that file may not need to be collected in certain contexts (for example, during litigation).

Additionally, these returned hashes can determine if a file or metadata corresponding to a file has already been copied into storage in association with another task or objective by comparing hash values in the storage 954 associated with files to the list of returned hashes. By filtering the files to be collected using these hashes resources such as bandwidth and storage may be conserved.

The files may be collected by the desktop agent on the desktop computer 920 and at step 962 sent back to the appliance 910. In one embodiment, the sending of these files may use a proprietary file transfer protocol running over TCP/IP which may not be as subject to latency problems as other protocols, such as CIFS and NFS. Furthermore, the files may be encrypted and compressed before they are sent to the appliance 910, increasing security and conserving resources by reducing the bandwidth needed to send a file and the storage needed for the file. Moreover, when the files are sent to the appliance 910 bandwidth throttling may be used with respect to the connection speed between the desktop agent and the appliance 910. Connection multiplexing may also be used in conjunction with multiple desktop agents on multiple desktop computers communicating with appliance 910.

The files collected are received at appliance 910 where they may be stored in desktop collector storage 984 on the appliance 910. Files in the desktop collector storage 984 on the appliance may then be copied to remote storage 954 according to corresponding policies. It will be noted the application of policies to the files in the desktop collector storage 984 may be done asynchronously to the operation of desktop agents on desktop computers. Additionally, these returned hashes can determine if a file or metadata corresponding to a file has already been copied into storage in association with another task or objective by comparing hash values in the storage 954 associated with files to the list of returned hashes. By filtering the files to be collected using these hashes resources such as bandwidth and storage may be conserved.

After files associated with a task are sent to appliance 910 or the task has otherwise been completed by the desktop agent on the desktop computer 920 an end of task notification may also be sent from the desktop agent to the appliance at step 972, where the end of task notification may designate that all files associated with a task that need to be sent to the appliance have been sent.

A completion of task notification may then be sent from the appliance 910 to the desktop agent on the desktop computer 920 at step 982. After the completion of any other desired tasks, for example associated with a particular objective, a remove agent request may be sent from appliance 910 to desktop agent on the desktop computer 910 at step 992. In response to such a remove agent request, the desktop agent on desktop computer 920 may remove itself from the desktop computer 920.

Accordingly, as can be seen then, a desktop agent may be installed only on specific desktop computers within a particular environment and only when needed to accomplish specific tasks for specific objectives. Such a desktop agent may also be easily removable when the specified tasks have been completed. By using these just in time desktop agents, and targeting them to specific desktop computers a number of advantages can be achieved. First and foremost the number of desktops on which agents are to be installed may be specified in great detail, allowing easier installs, management, support, etc. Additionally, the files to be collected may be specified in great detail and the files meeting these specifications may be refined without the need to actually send the file first.

Furthermore, as a desktop agent may have access to an appliance and associated storage, it may be possible for a desktop agent to collect files for tasks, where only files which are not already in storage or which have changed since they were last placed in storage may be collected from the desktop computer. Moreover, such a desktop agent may work in a tethered or untethered environment (for example, when desktop is off or on-line), may operate in the foreground or background of the desktop computer, may leave off or resume operation when the desktop computer is shut down or asleep, etc. By allowing such a desktop agent to expire or be removed after the desired tasks are completed in addition to the ability to target the agent to specific desktops and files a just in time agent may place less stress on a particular environment and achieve more efficient and effective operation.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A system for desktop computer file management in a network, comprising:
   an appliance communicatively coupled to the network and having a computer readable medium storing a first set of computer instructions configured to select a set of desktop computers and further configured to deploy a desktop agent to a desktop computer in the set of desktop computers, the desktop agent comprising a second set of computer instructions configured to:
   install the desktop agent on a computer readable medium in the desktop computer;
   automatically implement the following on the desktop computer without communicating with the appliance over the network:
     a task queue for storing a set of tasks, wherein each task in the set of tasks is associated with:
       a classification defining files to which the each task applies;
       a directory scope defining areas of a local filesystem on the desktop computer on which the each task is to be performed; and
       a policy action associated with the each task;
     a harvest module configured to access one or more locations in the local filesystem of the desktop computer to obtain or determine metadata on one or more files in the local filesystem according to the directory scope associated with the each task;
     a classification module configured to determine if each of the one or more files in the local filesystem meets the classification associated with the each task by evaluating at least a portion of the metadata obtained or determined by the harvest module; and
     a policy module configured to apply the policy action associated with the each task to the one or more files based on the classification determined by the classification module;
   process the set of tasks in the task queue; and
   uninstall the desktop agent from the desktop computer after the set of tasks in the task queue has been completed.

2. The system of claim 1, wherein the desktop agent is further configured to:
   collect one or more selected files from the local filesystem of the desktop computer; and
   send the collected one or more selected files from the desktop computer to the appliance.

3. The system of claim 1, wherein the desktop agent is configured to execute multiple tasks from the set of tasks in the task queue in parallel or substantially in parallel.

4. The system of claim 1, wherein the desktop agent is configured to operate when the desktop computer is off-line.

5. The system of claim 1, wherein the desktop agent is further configured to send a list of one or more selected files associated with the each task to the appliance.

6. The system of claim 5, wherein the list of the one or more selected files comprises a hash of each of the one or more selected files, wherein the appliance is configured to send a list of designated files to the desktop agent, wherein the desktop agent is further configured to receive the list of designated files from the appliance.

7. The system of claim 1, wherein the desktop agent is further operable for receiving a list of designated files from the appliance, and wherein the policy action is applied by the desktop agent only to the designated files.

8. A method for desktop computer file management in a network, the method comprising:
   installing a desktop agent of an appliance on a desktop computer communicatively coupled to the appliance over the network, wherein the desktop agent comprises instructions translatable by the desktop computer;
   automatically implementing, by the desktop agent, the following on the desktop computer without communicating with the appliance over the network:
     a task queue for storing a set of tasks, wherein each task in the set of tasks is associated with:
       a classification defining files to which the each task applies;
       a directory scope defining areas of a local filesystem on the desktop computer on which the each task is to be performed; and
       a policy action associated with the each task;
     a harvest module configured to access one or more locations in the local filesystem of the desktop computer to obtain or determine metadata on one or more files in the local filesystem according to the directory scope associated with the each task;
     a classification module configured to determine if each of the one or more files in the local filesystem meets the classification associated with the each task by evaluating at least a portion of the metadata obtained or determined by the harvest module; and a policy module configured to apply the policy action associated with the each task to the one or more files based on the classification determined by the classification module;

processing, by the desktop agent, the set of tasks in the task queue; and uninstalling the desktop agent from the desktop computer after the set of tasks in the task queue has been completed.

9. The method of claim 8, further comprising:

collecting, by the desktop agent, one or more selected files from the local filesystem of the desktop computer; and sending the collected one or more selected files from the desktop computer to the appliance.

10. The method of claim 8, wherein the processing further comprises:

executing, by the desktop agent, multiple tasks from the set of tasks in the task queue in parallel or substantially in parallel.

11. The method of claim 8, wherein the desktop agent is configured to operate when the desktop computer is off-line.

12. The method of claim 8, further comprising:

sending, by the desktop agent, a list of one or more selected files associated with the each task to the appliance.

13. The method of claim 12, wherein the list of the one or more selected files comprises a hash of each of the one or more selected files, wherein the method further comprises:

sending, by the appliance a list of designated files to the desktop agent; and receiving, by the desktop agent, the list of designated files from the appliance.

14. The method of claim 12, wherein the desktop agent is further configured to receive a list of designated files from the appliance, and wherein the policy action is applied by the desktop agent only to the designated files.

15. A non-transitory computer readable medium comprising instructions translatable by a processor for:

installing a desktop agent of an appliance on a desktop computer communicatively coupled to the appliance over a network;

automatically implementing the following on the desktop computer without communicating with the appliance over a network:

a task queue for storing a set of tasks, wherein each task in the set of tasks is associated with:

a classification defining files to which the each task applies;

a directory scope defining areas of a local filesystem on the desktop computer on which the each task is to be performed; and a policy action associated with the each task;

a harvest module configured to access one or more locations in the local filesystem of the desktop computer to obtain or determine metadata on one or more files in the local filesystem according to the directory scope associated with the each task;

a classification module configured to determine if each of the one or more files in the local filesystem meets the classification associated with the each task by evaluating at least a portion of the metadata obtained or determined by the harvest module; and a policy module configured to apply the policy action associated with the each task to the one or more files based on the classification determined by the classification module;

processing the set of tasks in the task queue; and uninstalling the desktop agent from the desktop computer after the set of tasks in the task queue has been completed.

16. The non-transitory computer readable medium of claim 15, wherein the instructions are further translatable by a processor for:

collecting one or more selected files from the local filesystem of the desktop computer; and sending the collected one or more selected files from the desktop computer to the appliance.

17. The non-transitory computer readable medium of claim 15, wherein the instructions are further translatable by a processor for:

executing multiple tasks from the set of tasks in the task queue in parallel or substantially in parallel.

18. The non-transitory computer readable medium of claim 15, wherein the instructions are further translatable by a processor for:

operating the desktop agent when the desktop computer is off-line.

19. The non-transitory computer readable medium of claim 15, wherein the instructions are further translatable by a processor for:

sending a list of one or more selected files associated with the each task to the appliance.

20. The non-transitory computer readable medium of claim 19, wherein the list of the one or more selected files comprises a hash of each of the one or more selected files, wherein the appliance is configured to send a list of designated files to the desktop agent, wherein the desktop agent is further configured to receive the list of designated files from the appliance.

21. The non-transitory computer readable medium of claim 15, wherein the instructions are further translatable by a processor to receive a list of designated files from the appliance, wherein the policy action is applied only to the designated files.

* * * * *